UNITED STATES PATENT OFFICE.

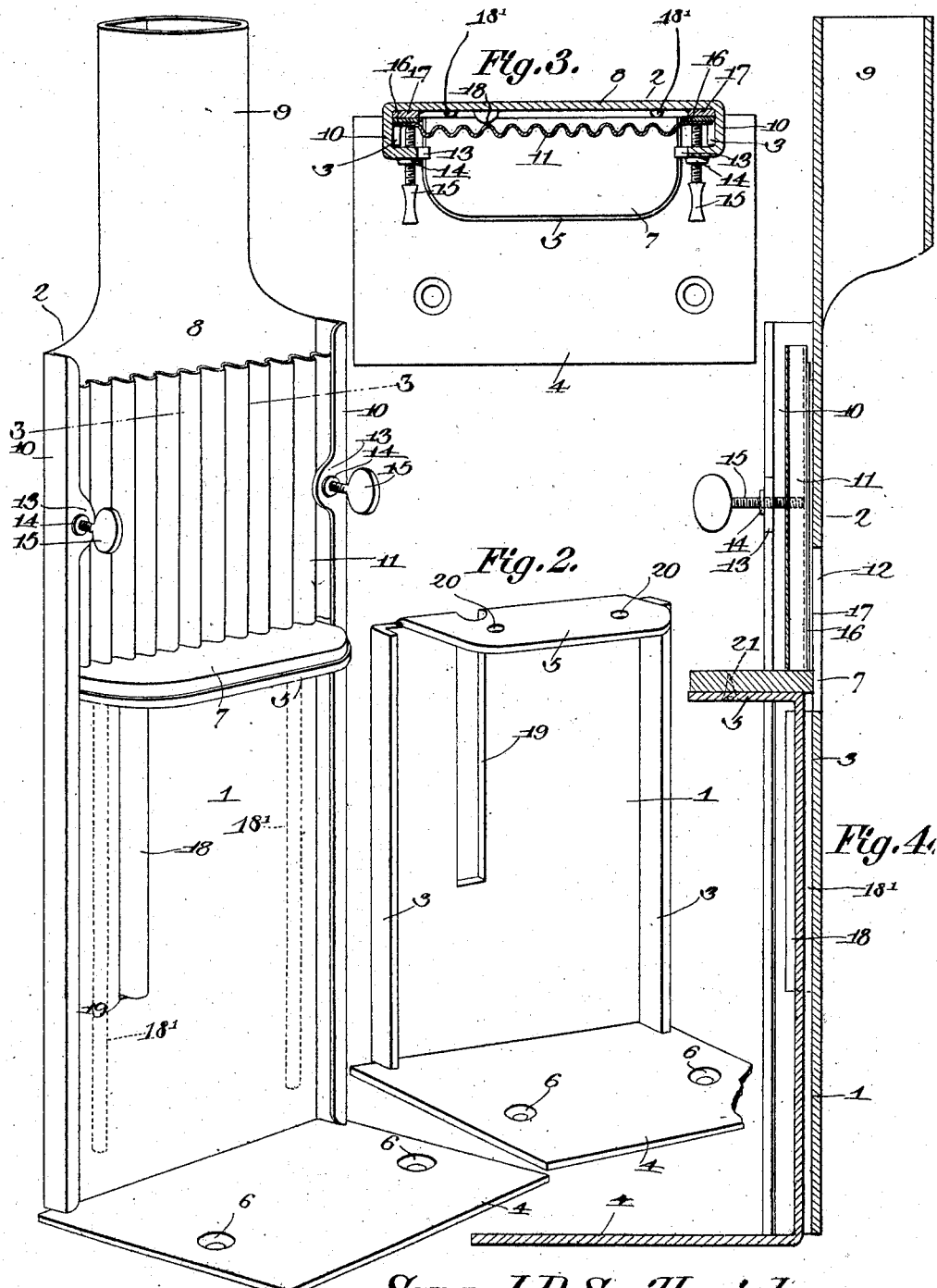

SAMUEL D. SMITHWICK, OF WASHINGTON, DISTRICT OF COLUMBIA.

FRUIT AND VEGETABLE CUTTER.

No. 878,833.  Specification of Letters Patent.  Patented Feb. 11, 1908.

Application filed May 22, 1907. Serial No. 375,062.

*To all whom it may concern:*

Be it known that I, SAMUEL D. SMITHWICK, a citizen of the United States, residing at Washington, in the District of Columbia, have invented a new and useful Fruit and Vegetable Cutter, of which the following is a specification.

This invention relates to fruit and vegetable cutters.

The object of the invention is to provide a novel form of fruit and vegetable cutter which shall be simple and inexpensive of construction, of great strength and durability, adapted for cutting fruit and vegetables into narrow strips or slices, and being capable of adjustment to vary the thickness of the strips and slices cut.

With the above and other objects in view, as will appear as the nature of the invention is better understood, the same consists in the novel construction and combination of parts of a fruit and vegetable cutter, as will be hereinafter fully described and claimed.

In the accompanying drawings forming a part of this specification, and in which like characters of reference indicate corresponding parts; Figure 1 is a view in perspective of a fruit and vegetable cutter, constructed in accordance with the present invention. Fig. 2 is a perspective detail view of the base thereof. Fig. 3 is a horizontal sectional view taken on the line 3—3, Fig. 1. Fig. 4 is a vertical sectional view through the apparatus.

Referring to the drawings, 1 designates generally the base of the cutter, and 2, generally, the knife carrier.

The base is constructed preferably of a single piece of sheet metal of appropriate thickness to impart the desired rigidity to the apparatus, and is provided with two guides 3, extending at right angles to the body of the base, and occupying normally a vertical position, a foot 4 and a table 5, these latter two parts being also extended at right angles to the body of the base, and projected from the same side thereof as the guides 3. The foot 4 is herein shown as rectangular in form, although it may be of any other desired contour and is provided with orifices 6 through which screws may be passed to secure the base in position upon a table or other suitable support. The table 5 is shown as provided with rounded corners, but this is not essential as this element may be also rectangular in form, and still be within the scope of the invention. By preference the base will be stamped from a single piece of sheet metal, this procedure being preferred on account of the cheapness and readiness with which it may be accomplished, but it is to be understood that if preferred it may be cast and still be within the scope of the invention. The table 5 has combined with it a chopping surface 7 which may be of wood, or any other suitable material adapted to protect the edge of the knife presently to be described.

The knife carrier 2 embodies a back plate 8 provided at its upper end with a tubular handle 9, formed integral with the plate, and at its edges with hollow rectangular flanges 10 which are adapted to inclose the guides 3, as clearly shown in Fig. 3, the co-action between the flanges 3 and 10, causing the knife guide to move in a true line when reciprocated, to cause its knife 11 properly to coact with the chopping surface 7. The back plate is provided in alinement with the chopping surface with a transverse rectangular orifice 12 through which the material cut escapes to the rear of the cutter and onto the support to which it is secured.

The flanges 10 are provided near their upper edges with ears 13 reinforced by bosses 14 which are threaded to receive thumb bolts 15 that are adapted to engage with the knife 11, as clearly shown in Fig. 3 to clamp it in its adjusted position. In order to vary the thickness of the cut of the knife, there are fillers 16 and 17 interposed between the knife and the back plate, as shown in Fig. 3, the fillers 16 being preferably metallic strips and the fillers 17 preferably of wood. The metallic fillers 16 may always be combined with the machine, but the wooden fillers may be removed entirely or replaced by thicker or thinner ones in order to vary the cut for the purpose stated.

In order to brace the base plate against any tendency to yield in the operation of the implement, the back plate is provided with a reinforcing rib or fin 18 which extends from the lower edge of the orifice 12 to a point about midway of the height of the back plate, and in order to permit reciprocation of the knife carrier without interference with the rib, the body of the base is provided with a vertical slot 19 which straddles the rib, as clearly shown in Fig. 3.

The rib or fin 18 not only serves to reinforce and strengthen the back plate but also serves to guide the cutter when the latter is reciprocated. The back plate 2 is also provided with two or more longitudinal ribs 18' preferably arranged one on each side of the rib 18 and which serve to space the back plate from the base 1 and thus prevent undue friction between the same. If desired, however, the ribs 18' may be secured to or formed integral with the base 1 instead of the back plate, the result accomplished being the same in both cases.

The knife 11 is herein shown as corrugated and this will generally be the preferred form, but as will be obvious it may be made straight or flat without departing from the scope of the invention.

In the use of the apparatus, the knife having been adjusted to make the desired cut, the material to be operated upon is placed upon the table and the knife carrier is raised, and upon the material being pushed inward until it contacts with the back plate the thickness of the slices or strips is determined and upon a downward movement being imparted to the knife carrier the corrugations in the knife will sever from the fruit or vegetables a plurality of strips and discharge them through the orifice 12, the operation being repeated as often as necessary. By the employment of the chopping surface 7 a complete severing of the fruit or vegetable from the stock is secured without danger of dulling the knife, which will inevitably result if the knife were allowed to strike directly upon the table. As the chopping surface will in time become scored or roughened from use it is preferable that it should be detachably combined with the table and to secure this result the table is provided with a plurality of orifices 20 in this instance two, through which screws 21 will pass from beneath and into the table.

By making the base in one piece as described, there will be no danger of it becoming deranged from use, and as the knife carrier is readily detachable therefrom without loosening any of its parts or disturbing the adjustment of the knife, should the base, which will generally be permanently fixed with the support, be damaged, repairs may readily be effected, or a new base piece applied for one that has been rendered useless.

Having thus described the invention, what is claimed is:—

In a vegetable cutter, the combination with a base having a longitudinal slot formed therein, of a knife carrier having a back plate provided with flanges, a knife held between the flanges, fillers interposed between the knife and the back plate of the carrier, a guiding rib secured to the back plate and slidably mounted in said slot, and securing devices carried by the flanges to hold the knife in adjusted position.

In testimony that I claim the foregoing as my own, I have hereto affixed my signature in the presence of two witnesses.

SAMUEL D. SMITHWICK.

Witnesses:
E. HUME TALBERT,
JAS. M. WALKER.